No. 733,290. PATENTED JULY 7, 1903.
C. SIMON.
LIQUID MEASURING DEVICE.
APPLICATION FILED MAY 1, 1903.
NO MODEL. 2 SHEETS—SHEET 2.
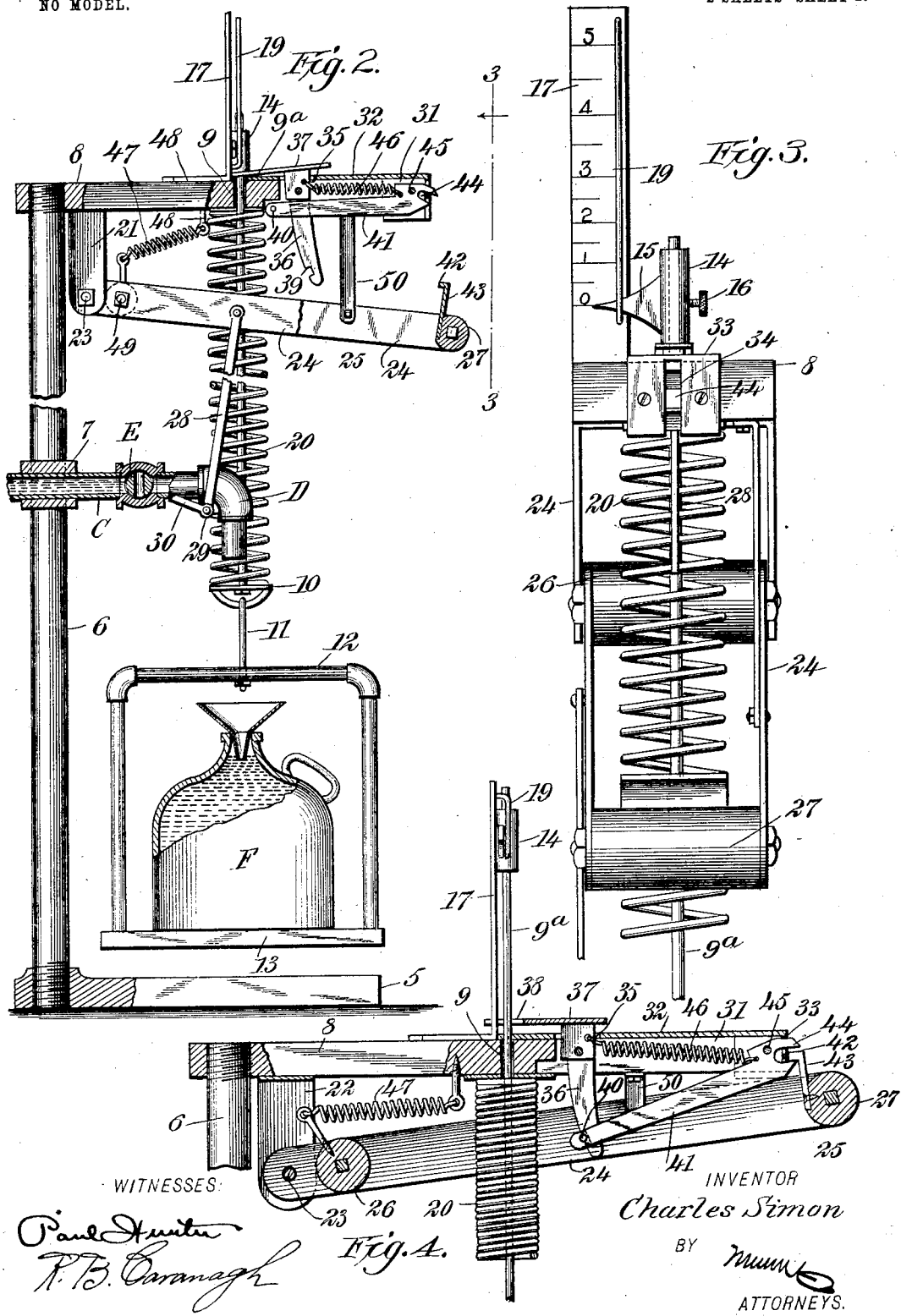
WITNESSES:
Paul Hunter
R. B. Cavanagh
INVENTOR
Charles Simon
BY Munn
ATTORNEYS.

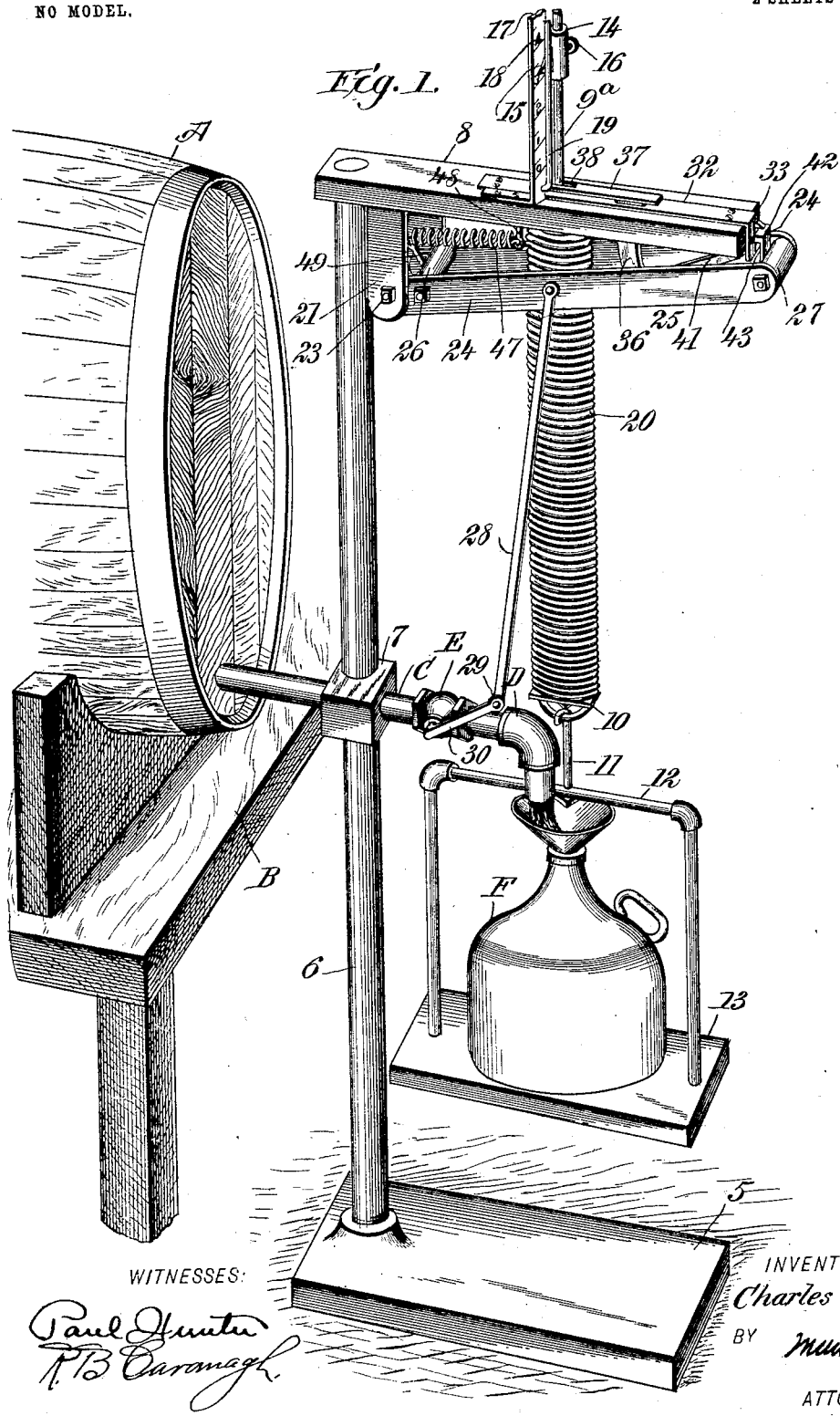

No. 733,290. Patented July 7, 1903.

UNITED STATES PATENT OFFICE.

CHARLES SIMON, OF AVILLA, INDIANA.

LIQUID-MEASURING DEVICE.

SPECIFICATION forming part of Letters Patent No. 733,290, dated July 7, 1903.

Application filed May 1, 1903. Serial No. 155,145. (No model.)

*To all whom it may concern:*

Be it known that I, CHARLES SIMON, a citizen of the United States, and a resident of Avilla, in the county of Noble and State of Indiana, have invented new and useful Improvements in Liquid-Measuring Devices, of which the following is a full, clear, and exact description.

This invention relates to certain improvements in liquid-measuring devices.

The principal object of the present invention is to provide a simple and inexpensive device which may be connected with the valve of the discharge-faucet of a liquid-receiving tank or receptacle in such manner that the amount of liquid discharged from said tank will be measured and automatically controlled.

A further object of the invention is to provide a measuring device wherein the use of levers and weights to counterbalance the weight of the scale-pan and the receptacle to be filled from the tank is obviated.

With these and other objects of a similar nature in view the invention consists in the construction, combination, and arrangement of parts, as is described in this specification, delineated in the drawings, and set forth in the annexed claims.

Reference is to be had to the accompanying drawings, forming a part of this specification, in which similar characters of reference indicate corresponding parts in all the figures.

Figure 1 is a perspective view of a mechanism embodying my improvements, such view also illustrating the application of the device. Fig. 2 is a side view, partly in elevation and partly in section, showing the relative position of parts of the mechanism after the latter has been operated to shut off the flow of liquid from the tank. Fig. 3 is a front view taken from the line 3 3 in Fig. 2 of portions of my improvements, and Fig. 4 is a longitudinal vertical sectional view of the mechanism for automatically actuating the faucet-valve of the liquid-storage tank.

Referring now to the accompanying drawings in detail, A designates a cask or receptacle of any ordinary or well-known form, such as is commonly used for the storage of molasses, oil, and similar liquids. This cask may be supported above the surface of the ground by any suitable means, such as a table B, and the aforesaid receptacle is further provided with a faucet C, having a curved head D and a cut-off valve E located in the tubular portion of the faucet a short distance from said head.

The mechanism forming the subject-matter of my invention, which is designed to be used in connection with the liquid-containing receptacle above described, may be provided with any suitable framework—for instance, such as shown in Fig. 1 of the drawings, wherein the numeral 5 designates a base-block adapted to rest upon the ground adjacent to the cask-supporting means, said base-block having extending therefrom a vertical standard 6, this standard having an apertured bearing-block 7 mounted thereon in an approximately horizontal line with the faucet, the tubular body portion of the faucet passing through the aperture in the bearing-block, whereby said faucet will be rigidly supported relative to the frame of the weighing mechanism. The upper extremity of the standard 6, which is approximately on a level with the top of the barrel or cask, has secured thereto a horizontal bar 8, this bar being adapted to form the main support for the tripping and valve-actuating portions of my device. The cross-bar 8 has a vertical bore or aperture 9 extending approximately centrally therethrough, such aperture being adapted to permit the passage of the sliding rod $9^a$, the lower end of said bar being formed with a supporting-loop 10, adapted to be engaged by the suspending-hook 11, connected to the vertical frame 12 of the weighing-pan 13. To the upper end portion of the sliding rod $9^a$ is secured a sleeve 14, carrying an indicating-pointer 15, said sleeve being adjustable along said rod through the medium of a set-screw 16. As will be clearly seen in Figs. 2 and 3, there is attached to the cross-bar 8, adjacent to the sliding rod $9^a$, a vertically-extending bar 17, provided with graduated marks of measurement and numerals indicating the value of the same, such as shown at 18, these marks indicating the weight of the matter on the scale either in pounds or ounces or in terms of liquid measurement, as desired. A guide-rod 19 is secured to the graduating measuring-bar and extends parallel with the same, the indicating-pointer 15 of the sleeve 14 being adapted to move over the surface of the bar and beneath the guide-rod. Interposed between the under surface of the bar 8 and the loop 10 of the sliding rod 9ª and encircling said rod is a coiled spiral tension-spring 20, offering resistance to or tensioning the downward movement of the sliding measuring-rod after the manner of the ordinary spring-scale.

The above description relates mainly to the construction of the frame of my improved device and the construction of the scale or weighing mechanism, and I will now proceed to describe the means employed for automatically shutting off the supply of liquid from the tank when the proper amount of liquid has flowed into a receptacle, such as the jar or jug F, placed upon the weighing-pan.

Depending from the bar 8 at the point near the juncture of the latter with the vertical standard 6 are two parallel lugs 21 and 22, said lugs having extended through the lower extremities thereof a horizontal pin 23, to which are pivotally secured the side bars 24 24 of the swinging lever 25, said bars being formed of strips of any suitable material—such as wood, metal, or the like—and extending approximately parallel to a short distance beyond the free end of the rigid cross-bar 8, these members 24 24 being connected and strengthened through the short cross-bars 26 and 27, which are preferably in the form of metallic pins extending through the short cylindrical sections constructed of wood. To one of the sides 24 is secured the depending bar 28, having pivoted to the lower end thereof, as at 29, a short arm 30, which arm is connected at its free end to the stem of the valve E of the faucet, the construction being such that when the lever 25 is dropped downward upon its pivot 23 the toggle connection formed by the bar 28 and the arm will tend to move the valve in the faucet to cut off the supply of liquid flowing therethrough.

In order to support the lever 25 in position to permit the liquid to flow freely through the faucet and to close the valve to shut off said flow when the proper amount has been transferred to a receptacle, such as the aforementioned jar F, I employ a form of trigger mechanism which is clearly shown in Figs. 2 and 4. The outer end portion of the cross-bar 8 is slotted longitudinally from the extremity thereof to a point adjacent to the central vertical aperture 9, said slot being designated by the numeral 31, and is preferably covered at the top surface of the bar 8 with a metallic strip 32, the end portion 33 of which is bent approximately at right angles to the main portion of the strip, this right-angled extension having a slot 34 cut therein. The main portion of the covering-strip 32, or that part lying upon the longitudinal upper surface of the bar 8, is also provided with a longitudinal slot or aperture 35, adapted to permit the passage of the depending finger 36, which finger is secured to one end of the trip 37, the aforesaid end of said trip being bifurcated, as at 38, to extend around the rod 9ª, the construction being such that when said rod is drawn downward a certain distance the sleeve 14 thereon will contact with the bifurcated end portion of the trip 37 and move the finger 36 upward and outward. The lower end of the aforesaid finger 36 is provided with a recess 39, adapted to seat the locking-pin 40 of the trigger-bar 41 when the lever 25 is in its locked or set position—that is to say, when the head 42 of the catch or lug 43, which is secured to the cylindrical cross-bar 27, is in locking engagement with the notched head portion 44 of the trigger 41—such trigger being pivotally secured, as at 45, in the slot in the bar 8 in such manner that the notched head portion 44 will protrude through the slot 34 of the covering plate or strip. A horizontally-disposed contraction tension-spring 46 is connected at one end to the head portion 44 of the trigger, while at its opposite end it is connected to the finger 36, this tension-spring being designed when the trigger is released through the sleeve on the sliding rod contacting with the trip of the finger to draw the main body portion of the trigger upward to a position of rest in said slot, as is clearly shown in Fig. 2, thereby permitting the head portion to move downward on the pivot 45, which downward movement releases the catching-lug 43, this action allowing the lever to drop partially by its own weight and partially through the force exerted by the contraction-spring 47, connected at 48 to the under side of the bar 8 and at 49 to the rear end of the lever 25.

From the above description, taken in connection with the accompanying drawings, the construction and operation of my improved device will be readily apparent. The vessel to be filled, such as the jug F, is placed upon the weighing-pan, and the sleeve of the indicator is then adjusted to the number indicating the desired quantity of liquid which is to be transferred from the cask to the vessel on the pan. The lever is then swung upward, and as the head 42 of the locking-lug 43 contacts with the notched head 44 of the trigger it will force the main portion of the trigger downward and outward until the pin 40 seats in the recess 39, which will cause the device to be locked in the position shown in Fig. 1. The action of raising the lever causes the toggle-rods to open the valve of the faucet, thereby permitting the liquid to flow into the jug F. As the liquid flows into the jug the spring 20 expands under the increasing weight on the pan and the sliding rod is drawn downward until when the desired amount is in the jug the lower edge of the sleeve 14 will reach the position at zero, as shown in Figs. 2 and 3, and contact with the trip 37 to release the trigger, as hereinbefore described, the weight of the lever, assisted by the spring 47, causing said lever to swing rapidly on its pivot, thereby actuating the toggle-rods to automatically cut off the flow of the liquid. The downward movement of the lever may be limited by any suitable agency, such as a flexible hinge or strip 50. It will be observed that there are many advantages incident to this improved machine, among them being that it is unnecessary to watch the mechanism when the vessel is being filled, as the supply will be automatically cut off, and, furthermore, it is to be noted that the adjustment of numerous levers, weights, and the like is obviated.

While I have shown and herein described one particular embodiment of my invention, it is of course to be understood that I do not limit myself to the precise details of construction shown herein, as there may be modifications and variations in certain respects without departing from the essential features of the invention or sacrificing any of the advantages thereof.

Having thus described my invention, I claim as new and desire to secure by Letters Patent—

1. In a liquid-measuring device, the combination with a faucet and a valve therefor, of a supporting-frame, a movable member secured to said frame, a trigger mechanism for releasably locking the movable member to the frame, and a connection between the movable member and the valve, substantially as set forth.

2. In a liquid-measuring device, the combination with a faucet and a valve therefor, of a supporting-frame, a scale mechanism mounted therein, a lever pivoted at one end to the frame, a trigger mechanism for detachably connecting the free end of the lever to the frame, and a toggle connection between the valve and the lever, the construction being such that when the trigger is operated by the action of the scale under a predetermined weight, the lever will be released and the faucet-valve closed, substantially as set forth.

3. The combination with a faucet, and a valve therefor, of a frame, a spring-scale mechanism including a sliding rod and an indicator mounted in said frame, of a lever pivoted at one end to said frame, a connection between the lever and the valve, and a trigger mechanism including a trip for detachably connecting the free end of the lever to the frame, the construction being such that when the trip is actuated by the movement of the scale-rod, the lever will be released to close the valve, substantially as set forth.

4. The combination with a faucet, and a valve therefor, of a frame, a scale mechanism including a graduated scale-bar and a movable rod having an adjustable indicating-pointer thereon adapted to travel over the graduated bar with the movement of the rod, a lever pivoted to the frame, a connection between the lever and valve, and means for detachably securing one end of the lever to the frame, such means comprising a tripping-finger mounted adjacent to the scale-rod, and a latch connection between the end of the lever and the frame, adapted when the trip is operated by the indicating-pointer of the scale-rod, to release the lever and thereby close the valve, substantially as set forth.

5. The combination with a faucet, and a valve therefor, of a frame, a scale mechanism carried thereby, a spring-tensioned lever pivoted at one end to the frame, a connection between the lever and the valve, and spring-tensioned means for detachably connecting the free end of the lever to the frame, said means being adapted to be actuated by the scale mechanism for releasing the lever, thereby closing the valve, substantially as set forth.

6. The combination with a faucet, and a valve therefor, of a frame, means carried by said frame for closing the faucet-valve, said means comprising a lever pivoted at one end to the frame, a connection between the lever and the valve, a catch at the free end of the lever, a trigger mechanism mounted in a slotted portion of the frame and adapted to be engaged by said catch, and means movably mounted on the frame for actuating said trigger to release the lever therefrom, the downward movement of the lever on its pivot actuating the connection between the lever and the valve to close said valve, substantially as set forth.

7. The combination with a faucet, and a valve therefor, of a frame mounted adjacent to said faucet, a spring-scale carried by said frame and supporting a pan at its lower end, a spring-tensioned lever pivoted to the frame at one end, a connection between the lever and the valve, and spring-tensioned trigger mechanism mounted within the slotted portion of the frame adapted to detachably engage the free end of the lever and support the same to hold the valve in an open position, the construction being such that when the trigger mechanism is actuated by the action of the scale under a predetermined weight, the lever will be released from connection with the frame and the valve closed, substantially as set forth.

In testimony whereof I have signed my name to this specification in the presence of two subscribing witnesses.

CHARLES SIMON.

Witnesses:
 EDWIN C. DOWNEY,
 ARTHUR BENWARD.